(12) United States Patent
Sunkavalli et al.

(10) Patent No.: US 9,672,414 B2
(45) Date of Patent: Jun. 6, 2017

(54) ENHANCEMENT OF SKIN, INCLUDING FACES, IN PHOTOGRAPHS

(71) Applicant: Adobe Systems Incorporated, San Jose, CA (US)

(72) Inventors: Kalyan K. Sunkavalli, San Jose, CA (US); Zhe Lin, Fremont, CA (US); Xiaohui Shen, San Jose, CA (US); Joon-Young Lee, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 14/938,568

(22) Filed: Nov. 11, 2015

(65) Prior Publication Data

US 2017/0132459 A1    May 11, 2017

(51) Int. Cl.
*G06K 9/00* (2006.01)
*G06T 5/00* (2006.01)

(52) U.S. Cl.
CPC ..... *G06K 9/00288* (2013.01); *G06K 9/00228* (2013.01); *G06T 5/001* (2013.01)

(58) Field of Classification Search
USPC ....... 382/118, 167, 162, 141, 149, 264, 257, 382/267, 272, 274, 275; 345/419; 348/202.99, 234, E13.001
See application file for complete search history.

(56) References Cited

U.S. PATENT DOCUMENTS

| | | | |
|---|---|---|---|
| 7,881,554 B2* | 2/2011 | Castorina | G06T 5/008 382/264 |
| 8,958,638 B2* | 2/2015 | Webb | G06T 5/007 382/167 |

* cited by examiner

*Primary Examiner* — Anh Do
(74) *Attorney, Agent, or Firm* — Wolfe-SBMC

(57) ABSTRACT

An image processing application performs improved face exposure correction on an input image. The image processing application receives an input image having a face and ascertains a median luminance associated with a face region corresponding to the face. The image processing application determines whether the median luminance is less than a threshold luminance. If the median luminance is less than the threshold luminance, the application computes weights based on a spatial distance parameter and a similarity parameter associated with the median chrominance of the face region. The image processing application then computes a corrected luminance using the weights and applies the corrected luminance to the input image. The image processing application can also perform improved face color correction by utilizing stylization-induced shifts in skin tone color to control how aggressively stylization is applied to an image.

20 Claims, 9 Drawing Sheets

ENHANCEMENT OF SKIN, INCLUDING FACES, IN PHOTOGRAPHS

BACKGROUND

Faces are often the most important element in a photograph. However, it is often the case that a photograph does not have the right exposure which, in turn, can lead to the faces in the photograph being under-exposed and too dark. This happens, for example, when the lighting is behind the subject thus causing the background to be exposed properly and for the face to be too dark.

The color and tone of faces in photographs can also be degraded in post-process image editing. For example, people often apply different stylization filters to a photograph to enhance the photograph. However, these filters are typically applied globally, without any special consideration for semantically important regions likes faces. This, in turn, can create poor skin tones and under-exposed faces.

In the past, some attempts at face exposure correction relied on isolating skin pixels and then using luminance histograms to correct for shadows and exposure issues. In these instances, however, detecting skin regions can be difficult and can lead to unsatisfactory results. Moreover, luminance histograms do not always provide a visually smooth result. This, in turn, can lead to artifacts and other undesirable visual effects, such as unnatural, abrupt color transitions in the image, which are readily detectable by the human eye.

SUMMARY

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

In one or more implementations, a digital medium environment includes an image processing application that performs improved face exposure correction on an input image. The image processing application receives an input image that includes a depiction of a face and ascertains a median luminance associated with a face region corresponding to the depiction of the face. Luminance refers to the intensity or brightness in an image. The image processing application determines whether the median luminance is less than a threshold luminance. If the median luminance is less than the threshold luminance, the image processing application computes weights that are used to compute a corrected luminance. The weights are based on a spatial distance parameter and a similarity parameter associated with a median chrominance of the face region. The spatial distance parameter takes into account how far a particular pixel in the input image is from the center of a detected face. The similarity parameter takes into account how close a particular pixel's color is to the median chrominance of the face region. The image processing application then computes a corrected luminance using the weights and applies the corrected luminance to the input image. The corrected luminance provides a smoother, more visually-pleasing image than past approaches.

In one or more other implementations, a digital medium environment is described in which a computing device can use an image processing application to perform improved face color correction. The image processing application receives a stylized input image corresponding to an original input image and computes a median chrominance value for a face region corresponding to a face detected in the stylized input image. The image processing application then uses the median chrominance value to compute a shift in skin tone color caused when the original input image was stylized. A new stylization is generated by computing new color shifts, based on an amount of skin tone color shift caused when the original input image was stylized. The image processing application then applies the new stylization to the original input image that was originally stylized to provide the stylized input image. Here, the amount of skin tone color shift is used to control how aggressively the new stylization is applied to the original image.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Figure 1:
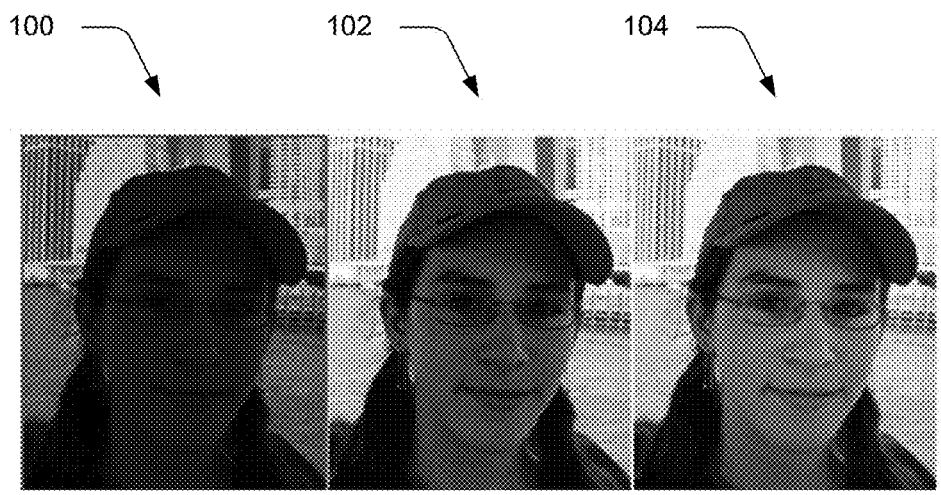
FIG. 1 is an illustration of an input image that has been processed using face exposure correction in accordance with one or more implementations.

Often times, when a photograph is taken and an image is captured, the image capture process itself, or subsequently applied stylization can cause regions of the image, such as face regions, to be underexposed and appear too dark. This can happen, for example, when lighting is behind the subject thus causing the background to be exposed properly, but for the face to be too dark. This can also happen through stylization processes in which different filters are applied globally to the photograph, without any special considerations for semantically important regions like faces. This can lead to poor skin tones and improperly exposed faces.

Introduced here are techniques that address the drawbacks of previous approaches, such as those that employ luminance histograms, by utilizing soft spatial and color weights to apply exposure correction. This results in a smooth, exposure-corrected image. Further, color stylization is employed in which deviations in a color processing model are used to control the manner in which stylization is applied which, again, results in a smooth color-corrected image. The improved image processing techniques provide better, more visually pleasing images over those images provided by past techniques, such as techniques that employed luminance histograms. This is due in part to the reduction of, or all together elimination of artifacts and other undesirable visual effects, such as abrupt color transitions in the image.

In one or more implementations, a digital medium environment includes an image processing application that performs improved face exposure correction on an input image. The image processing application receives an input image that includes a depiction of a face and ascertains a median luminance associated with a face region corresponding to the depiction of the face. The median luminance can be ascertained by measuring the median luminance, or otherwise receiving a median luminance value, as will be appreciated by the skilled artisan. For example, given a face region, pixel intensity values (such as L channel values in the CIELab colorspace) can be sorted and an intensity value in the middle of the sorted intensities can be used as the median luminance. The term "luminance" refers to the intensity or brightness in an image, and thus defines the achromatic portion of an image. The image processing application determines whether the median luminance is less than a threshold luminance. If the median luminance is less than the threshold luminance, the image processing application computes weights based on a spatial distance parameter and a similarity parameter associated with a median chrominance of the face region. The spatial distance parameter takes into account how far a particular pixel in the input image is from the center of a detected face. The similarity parameter takes into account how close a particular pixel's color in the input image is to a median chrominance of the face region. The image processing application then computes a corrected luminance using the weights and applies the corrected luminance to the input image.

In one or more other implementations, a digital medium environment is described in which a computing device can use an image processing application to perform improved face color correction. The image processing application receives a stylized input image corresponding to an original input image and computes a median chrominance value for a face region corresponding to a face detected in the stylized input image. The term "chrominance" refers to the signal used to carry color information of an image separately from the accompanying luminance signal. The image processing application then uses the median chrominance value to compute a shift in skin tone color caused when the original input image was stylized. A new stylization is generated by computing new color shifts, based on an amount of skin tone color shift caused when the original input image was stylized. The new stylization is applied to the original input image that was stylized to provide the stylized input image Here, the amount of skin tone color shift is used to control how aggressively the new stylization is applied to the original image.

Given the discussion above, and in order to provide some visual context for the improved image processing techniques discussed below, consider FIG. 1. FIG. 1 includes an image in which a face appears in the near foreground, and buildings appear in the background. The face appears too dark because of the way light illuminates the buildings in the background. Specifically, an image 100 includes a face in the near foreground and buildings in the background. The face, in this instance, is too dark because of the way the buildings are illuminated. Applying stylization techniques may result in an image 102 in which the face is still too dark. That is, while there is some improvement over image 100, image 102 may still be found by some to be too dark. The face exposure correction techniques described below, automatically brighten the face region to result in an image 104, without affecting other regions of the image, e.g., the buildings in the background. Here, most if not all would agree that the face in image 104 is more desirably illuminated than in either of the other images.

In addition, stylizing an input image by applying color and tone transformations may produce results where skin tones sometimes take on undesirable colors. For example, the skin tones may take on strong pink or reddish colors, or hues may be created which are unnatural and visually displeasing. The face color correction techniques described below are able to detect these cases automatically and weaken the stylization, where appropriate, to produce a result that does not have the undesirable color shifts.

The face exposure correction techniques and the face color correction techniques can be applied independently to an image, e.g., either technique can be applied but not both. Alternately or additionally, both techniques can be applied to an image in any order, e.g., face exposure correction can first be applied followed by face color correction, and vice versa. The result of these techniques, whether individually or jointly applied, is that images are more visually pleasing and less likely to be found unsatisfactory. As such, higher-quality images are obtained which avoid poor and inaccurate exposure and color.

In the following discussion, an example digital medium environment is first described that may employ the techniques described herein. Example implementation details and procedures are then described which may be performed in the example digital medium environment as well as other environments. Consequently, performance of the example procedures is not limited to the example environment and the example environment is not limited to performance of the example procedures.

Example Digital Medium Environment

Figure 2:
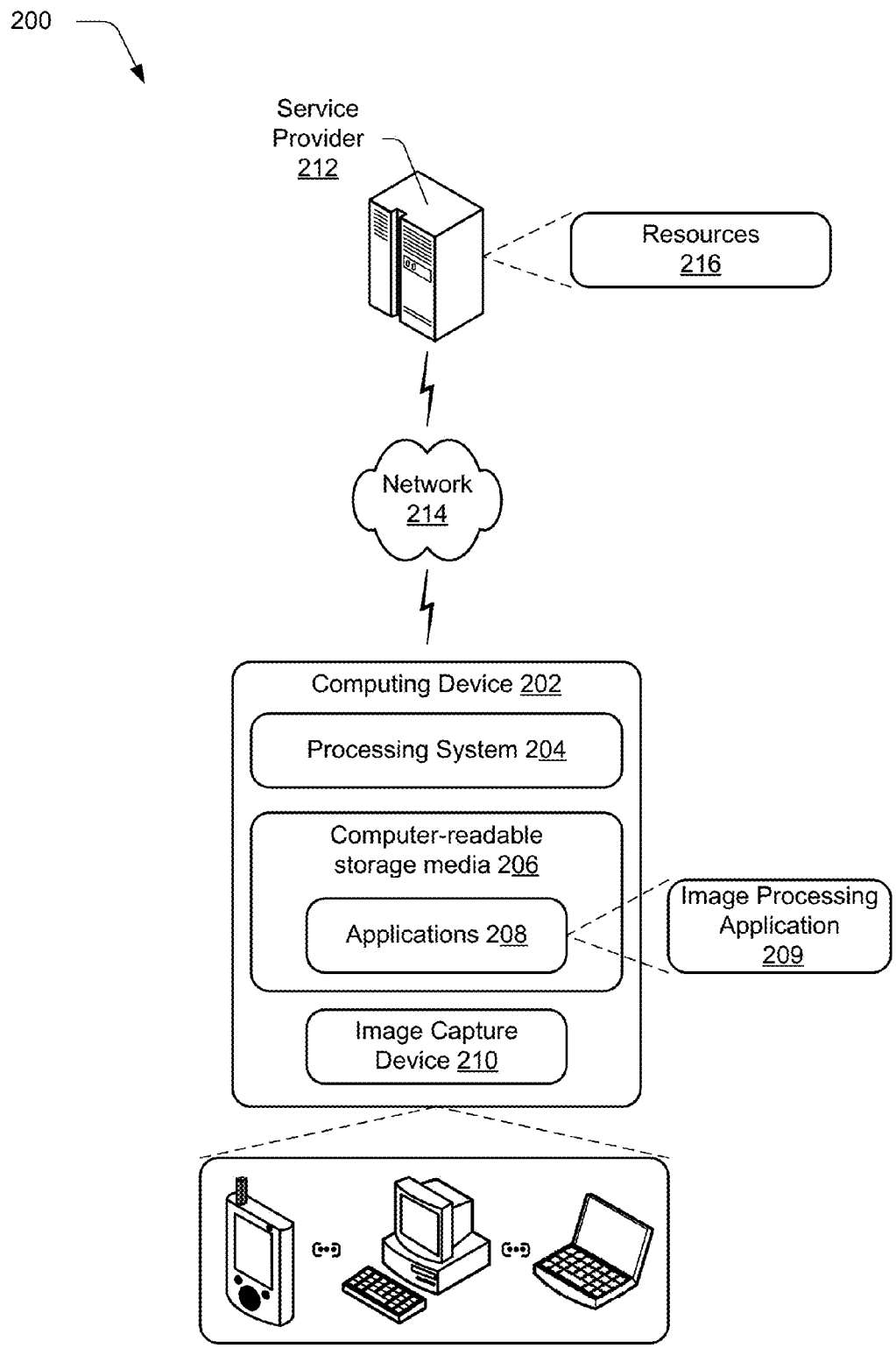
FIG. 2 is an illustration of a digital medium environment in an example implementation that is operable to employ techniques described herein.

FIG. 2 is an illustration of a digital medium environment 200 in an example implementation that is operable to employ techniques described herein. As used herein, the term "digital medium environment" refers to the various computing devices and resources that can be utilized to implement the techniques described herein. The illustrated digital medium environment 200 includes a computing device 202 including a processing system 204 that may include one or more processing devices, one or more computer-readable storage media 206, and various applications 208 embodied on the computer-readable storage media 206 and operable via the processing system 204 to implement corresponding functionality described herein. In at least some embodiments, applications 208 may include an image processing application 209. The image processing application 209 is configured to apply the face exposure correction and/or face color correction techniques as described below in more detail.

Applications 208 may also include a web browser which is operable to access various kinds of web-based resources (e.g., content and services). The applications 208 may also represent a client-side component having integrated functionality operable to access web-based resources (e.g., a network-enabled application), browse the Internet, interact with online providers, and so forth. Applications 208 may further include an operating system for the computing device and other device applications.

The computing device 202 may also, but need not, include an image capture device 210, such as a camera, that can capture images which may be automatically processed, as described below, by image processing application 209.

The computing device 202 may be configured as any suitable type of computing device. For example, the computing device may be configured as a desktop computer, a laptop computer, a mobile device (e.g., assuming a handheld configuration such as a tablet or mobile phone), a tablet, a camera, and so forth. Thus, the computing device 202 may range from full resource devices with substantial memory and processor resources (e.g., personal computers, game consoles) to a low-resource device with limited memory and/or processing resources (e.g., mobile devices). Additionally, although a single computing device 202 is shown, the computing device 202 may be representative of a plurality of different devices to perform operations "over the cloud" as further described in relation to FIG. 9.

The digital medium environment 200 further depicts one or more service providers 212, configured to communicate with computing device 202 over a network 214, such as the Internet, to provide a "cloud-based" computing environment. Generally, speaking a service provider 212 is configured to make various resources 216 available over the network 214 to clients. In some scenarios, users may sign up for accounts that are employed to access corresponding resources from a provider. The provider may authenticate credentials of a user (e.g., username and password) before granting access to an account and corresponding resources 216. Other resources 216 may be made freely available, (e.g., without authentication or account-based access). The resources 216 can include any suitable combination of services and/or content typically made available over a network by one or more providers. Some examples of services include, but are not limited to, a photo editing service (such as one that employs an image processing application such as image processing application 209), a web development and management service, a collaboration service, a social networking service, a messaging service, an advertisement service, and so forth. Content may include various combinations of assets, video comprising part of an asset, ads, audio, multi-media streams, animations, images, web documents, web pages, applications, device applications, and the like.

Various types of input devices and input instrumentalities can be used to provide input to computing device 202. For example, the computing device can recognize input as being a mouse input, stylus input, touch input, input provided through a natural user interface, and the like. Thus, the computing device can recognize multiple types of gestures including touch gestures and gestures provided through a natural user interface.

Having considered an example digital medium environment, consider now a discussion of some example details of an image processing application in accordance with one or more implementations.

Example Image Processing Application

Figure 3:
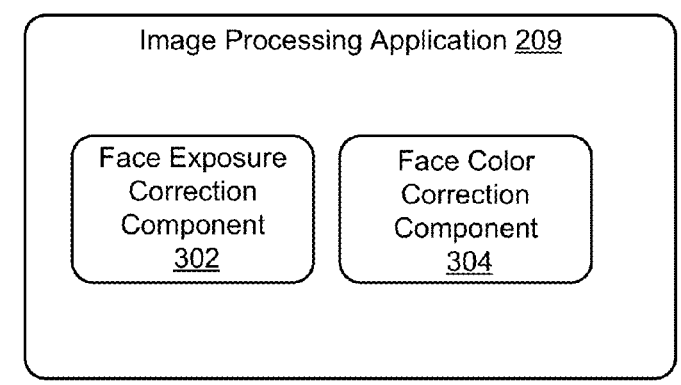
FIG. 3 illustrates an image processing application in accordance with one or more implementations.
Figure 3:
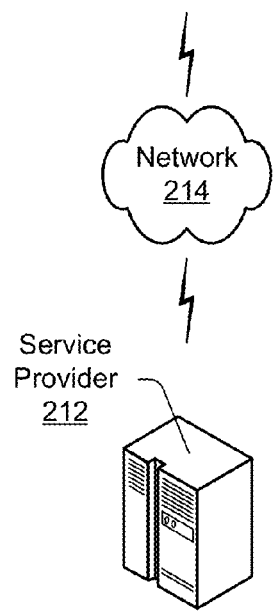

FIG. 3 illustrates a digital medium environment 300 that includes an example image processing application 209. In this implementation, the image processing application 209 includes a face exposure correction component 302 and a face color correction component 304.

Face exposure correction component 302 is representative of functionality that implements an automatic face exposure correction technique. The face exposure correction component 302 automatically detects one or more faces in a photograph or image using a face detector, such as one that employs a face rectangle to contain a detected face. The face exposure correction component 302 isolates the color and luminance of the skin region within the face rectangle using median statistics, described below in more detail. The face exposure correction component then applies exposure correction by using weights that combine spatial distance to the face rectangle center and similarity to the median skin color. Specifically, the spatial distance represents, for a particular pixel in the input image, the particular pixel's distance to the face rectangle center. The similarity to the median skin color represents a particular pixel's color similarity relative to the median skin color. Using median statistics in combination with spatial and color weights to apply face correction enables the face exposure correction component 302 to handle rough face rectangles, such as those that include not only a face but also background objects as well. Further, doing so reduces localization errors in the face detector by smoothing face exposure correction. The face exposure correction component 302 can operate on any photograph either post-capture e.g., on the camera or post-editing e.g., after the photograph has been transferred off the camera to a computing device.

Face color correction component 304 is representative of functionality that implements stylization and face color correction to provide visually pleasing smooth correction results. The face color correction component 304 models color processing as an affine color transform. An "affine transform" is a linear mapping function that preserves points, straight lines, and planes, as will be appreciated by the skilled artisan. Sets of parallel lines remain parallel after application of an affine transform. The face color correction component measures how much deviation the affine color transform causes to the skin color, which can be detected using the median color ascertained by the face exposure correction component 302. The deviation is then used to control how aggressively color stylization is be applied. Small shifts in stylization are allowed while large shifts are controlled to ensure that the final results are visually pleasing and accurate.

Having considered an example image processing application and its components, consider now an example face exposure correction component 302 in more detail.

Face Exposure Correction Component

As noted above, the process of capturing an image or applying stylization can over-darken some regions of an image. When this happens to faces, the perceived quality of the image suffers, as humans are typically sensitive to facial appearance and can easily detect these regions. In accordance with one or more implementations, a face-specific exposure correction method is employed to correct these issues.

Initially, an input image is received and facial detection techniques are employed to detect one or more face regions in the input image. Any suitable type of facial detection techniques can be employed. In one implementation, face regions in the input image are detected, given by center p and radius r, using an OpenCV (Open Source Computer Vision) face detector. According to this technique, a coarse box, e.g., a rectangular box, is utilized to define or otherwise contain a face region. The rectangular box is referred to as a "coarse" box because it can contain pixels outside of the face region, such as those that appear in the background. The median luminance in the face region is computed and if the median luminance in the face region is lower than a threshold $l_{th}$, the luminance is corrected as:

$$\hat{l}(x)=(1-w(x))*l(x)+w(x)*l(x)^\gamma \text{ if } \bar{l}<l_{th},$$

$$s.t. \ w(x)=\exp(-\alpha_r\|(x-p)/r\|^2)\exp(-\alpha_c\|c-\bar{c}\|^2),$$

$$\gamma=\max(\gamma_{th},0.65*\bar{l}/l_{th}).$$

This equation applies a simple γ-correction (gamma correction) to the luminance, where γth determines the maximum level of exposure correction. The equation essentially seeks to use weights (the w(x) term) to decide where to apply the correction. In practice, it is desirable to apply this correction to the entire face. However, because the face detection technique mentioned above detects the face region by using a coarse box, applying the correction to the entire box will produce undesirable artifacts. This is because the coarse box contains pixels that are not associated with the face region, e.g., those pixels just outside the boundary of the face region but inside the boundary of the coarse box. To mitigate this, the corrected luminance is interpolated with the original luminance using the weights w(x). These weights are computed based on how close a pixel is to the center of the face (corresponding to first exponential in the w(x) expression) and the spatial distance from the face center chrominance value, $\bar{c}$, to capture the color of the skin (corresponding to the second exponential in the w(x) expression). $\alpha_r$ and $\alpha_c$ are normalization parameters that control the weights of the spatial and chrominance kernels respectively. In one implementation, {γth, $\alpha_r$, $\alpha_c$} are set to {0.1, 0.45, 0.001}.

Pixels that are closest in color to the skin will receive more of a correction. As pixel colors move further away from the color of the skin, less correction is applied. So, for example, if a pixel color is quite different from the skin color, that particular pixel will not receive luminance correction. Such might be the case, for example, if the box that is used to detect the face is quite large such that it contains some pixels from the background that do not have a color that is the same as, or similar to the skin color.

This correction can be applied to multiple face regions in parallel to fix all of the faces that might appear in an image. In addition, when multiple faces appear close together in an image, the boxes that are respectively used for detecting each face may have a region of overlap. This means that pixels within the region of overlap can be corrected twice—once for the first face and once for the second face. In order to ensure that pixels are not double corrected, the face exposure correction component 302 maintains a map of pixels that have been corrected. When those pixels are again processed, the face exposure correction component 302 will keep the brighter correction of the corrections for the face. So, for example, assume that when the first face is processed one pixel received a correction factor of 1.2. Now, when the second face is processed assume that the same pixel received a correction factor of 1.5—which is a brighter correction. The face exposure correction component 302 will keep the correction factor of 1.5 for that particular pixel.

Figure 4:
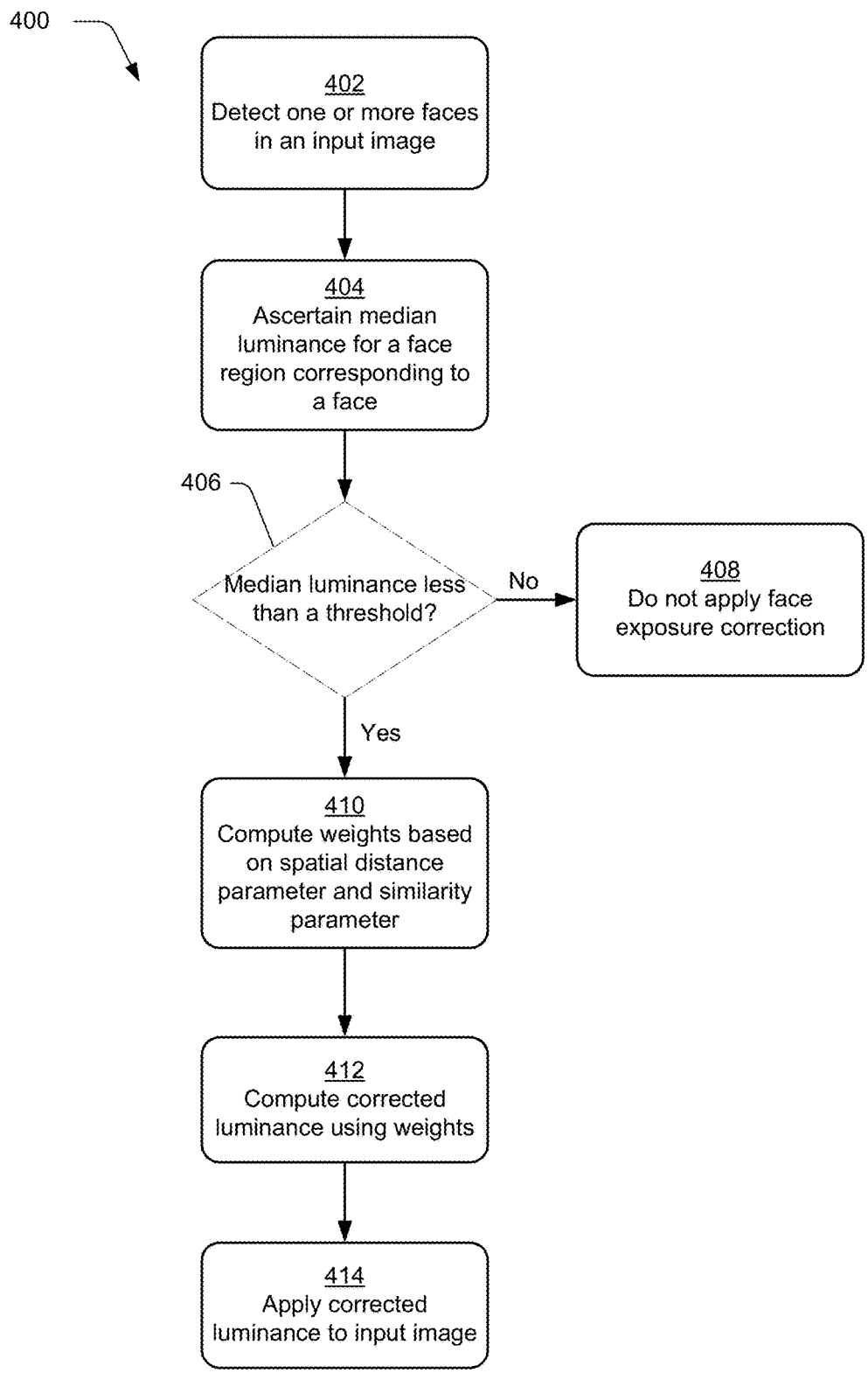
FIG. 4 is a flow diagram depicting an example procedure in accordance with one or more implementations.

FIG. 4 describes an example face exposure correction procedure 400 for correcting over-darkened regions that can appear in images in accordance with various implementations. Aspects of the procedures may be implemented in hardware, firmware, or software, or a combination thereof. The procedures are shown as a set of blocks that specify operations performed by one or more devices and are not necessarily limited to the orders shown for performing the operations by the respective blocks. In at least some embodiments the procedures may be performed in a digital medium environment by a suitably configured device, such as the example computing device 202 of FIG. 2 that makes use of an image processing application 209, such as that described above.

An input image is received and one or more faces in the input image are detected (block 402). The median luminance for a face region corresponding to a face is ascertained (block 404). Any suitable techniques can be utilized for ascertaining the median luminance. For example, the median luminance can be ascertained by measuring the median luminance, or otherwise receiving a median luminance value, as will be appreciated by the skilled artisan. A determination is made as to whether the median luminance is less than a threshold luminance (block 406). If the median luminance is not less than a threshold, face exposure correction is not applied (block 408). If, on the other hand, the median luminance is less than a threshold, weights are computed based on a spatial distance parameter and a similarity parameter associated with the median chrominance of the face region. In one or more implementations, the spatial distance parameter corresponds to how close a particular pixel in the input image is to the center of a particular face. In the implementation described above, the center of a particular face is represented by the center of a face rectangle that was used to detect the face in block 402. Other spatial distances can be utilized without departing from the spirit and scope of the claimed subject matter. The similarity parameter corresponds to how similar a particular pixel color is to the median skin color in the face region. But one example of how this can be done is provided above.

A corrected luminance is then computed using the weights from block 410 (block 412) and then applied to the input image (block 414). The procedure described in blocks 410, 412, and 414 can be performed on a pixel-by-pixel basis.

Figure 5:
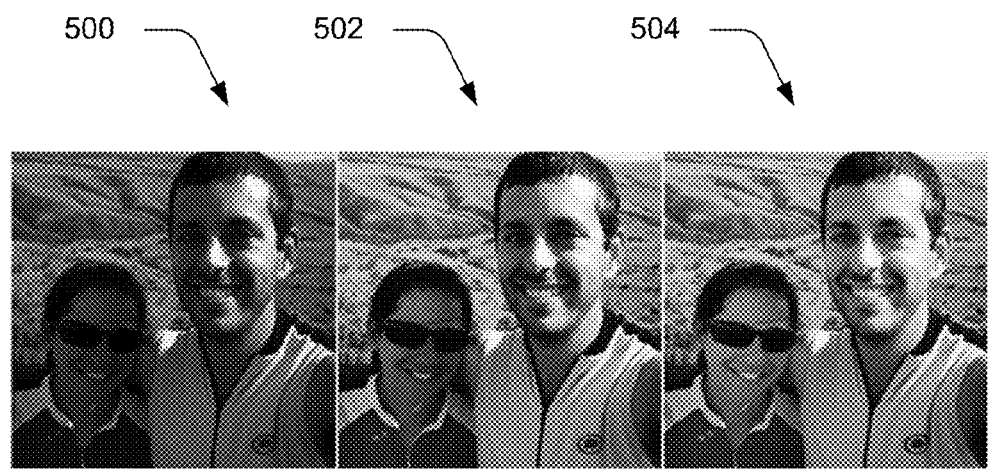
FIG. 5 is an illustration of an input image that has been processed using face exposure correction in accordance with one or more implementations.

FIG. 5 illustrates the result of using the above-described exposure correction technique on an input image 500. Notice that both faces in input image 500 appear undesirably dark. Image 502 represents input image 500 after stylization has been applied. Notice that the faces still appear dark. Image 504 represents image 502 after exposure correction has been applied as described above. Notice that the faces in image 504 are much brighter and clearer. Notice also that because of the smoothing aspect of the corrected luminance approach, the brightening has been applied to each face region without producing any visible artifacts in other regions of the image. The process just described improves upon image processing techniques by utilizing soft spatial and color weights to apply exposure correction, thus resulting in a smooth exposure-corrected image.

Having considered an example face exposure correction component and its operation in accordance with one implementation, consider now an example face color correction component.

Face Color Correction Component

Users often manipulate the color distribution of a photograph to stylize the photograph. This can be done in different ways. For example, some approaches utilize a filter that is applied to the photograph. Other approaches utilize a style example image which is used to manipulate the color distribution in the photograph (referred to as "stylization"), as will be appreciated by the skilled artisan. However, if these manipulations are not controlled properly, the manipulations can create undesirable color shifts on skin tones.

In the implementation about to be described, the effect of a color transform is controlled to ensure that the color transformation does not create undesirable color shifts on skin tones. In this particular example, the color manipulations utilize affine transformations of the color values. In particular, the input image is converted into the CIELab colorspace. CIELab is a model that shows uniform color spacing, as will be appreciated by the skilled artisan. An affine transform is applied to the chrominance channels in this colorspace to stylize the chrominance. This means that if the chrominance of the input image are given by c, the stylized chrominance, s at pixel, x, is given by:

$$s(x)=M(c(x)-t_1)+t_2,$$

where M captures the scaling and mixing of the chrominance and $t_{1/2}$ represent the shift in the input colors. That is, $t_1$ represents the chrominance mean of the input image and $t_2$ represents the chrominance mean of the style example image. M and $t_{1/2}$ could be the color transforms encoded in a hand-crafted filter or can be computed from a style example image, as noted above. While both M and $t_{1/2}$ can lead to artifacts in the final result, it has been observed that $t_2$ in particular, leads to hue shifts that can cause undesirable skin tones. Accordingly, in one or more implementations, undesirable shifts are avoided by controlling the shift in the chrominance values.

Similar to the face exposure correction process described above, face regions are detected using the OpenCV face detector. The median chrominance value of the input photograph, $\bar{c}$, in the face region is computed. This median value represents the skin tone in the input photograph. The shift in the skin tone color caused by the stylization can then be computed as:

$$d=\|\bar{c}-M(\bar{c}-t_1)-t_2\|^2.$$

Large values of d indicate large shifts in skin tone due to stylization, which typically leads to poor results. Based on this observation, $t_2$ is scaled to compute a new color shift $t_2'$ as follows:

$$\beta = \begin{cases} 1, & \text{if } d < d_{th} \\ \exp(-(d-d_{th})^2/\alpha_d), & \text{otherwise} \end{cases}$$

$$t_2' = t_1 + (\beta + d_{\mathit{off}})/(1+d_{\mathit{off}})*(t_2-t_1).$$

$d_{th}$ and $\alpha_d$ control what is considered as a large color shift and are set to 30 and 800 respectively. $d_{\mathit{off}}$ controls the minimum scaling of the color shift allowed and, in practice, is set to 0.20.

In one or more implementations, unlike the face exposure correction that is applied to only the face region, the face color correction is applied globally. This is done by changing the color stylization function at every pixel to use $t_2'$ instead of $t_2$. This modified color stylization function is applied to the original input image.

Figure 6:
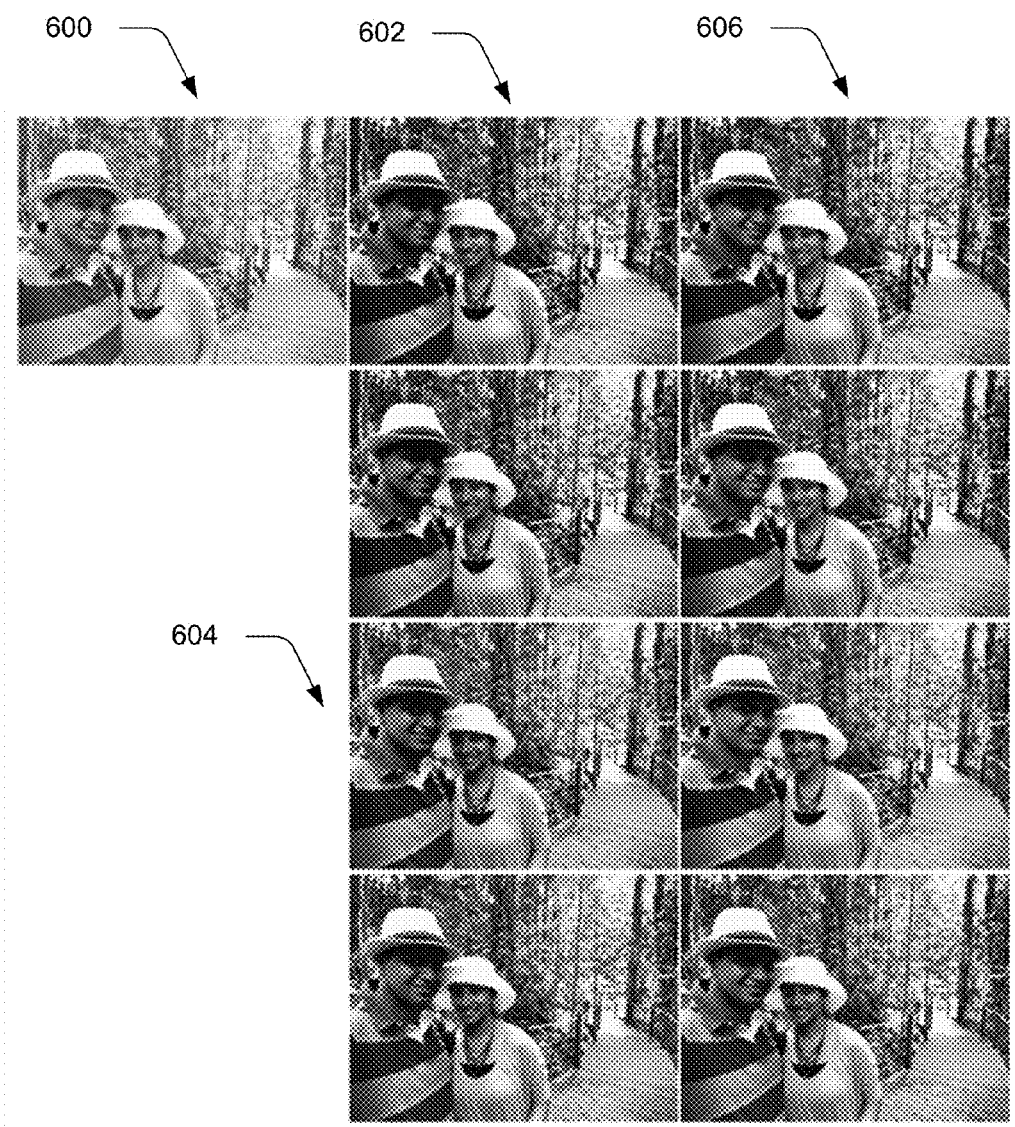
FIG. 6 is an illustration of an input image that has been processed using face color correction in accordance with one or more implementations.
Figure 7:
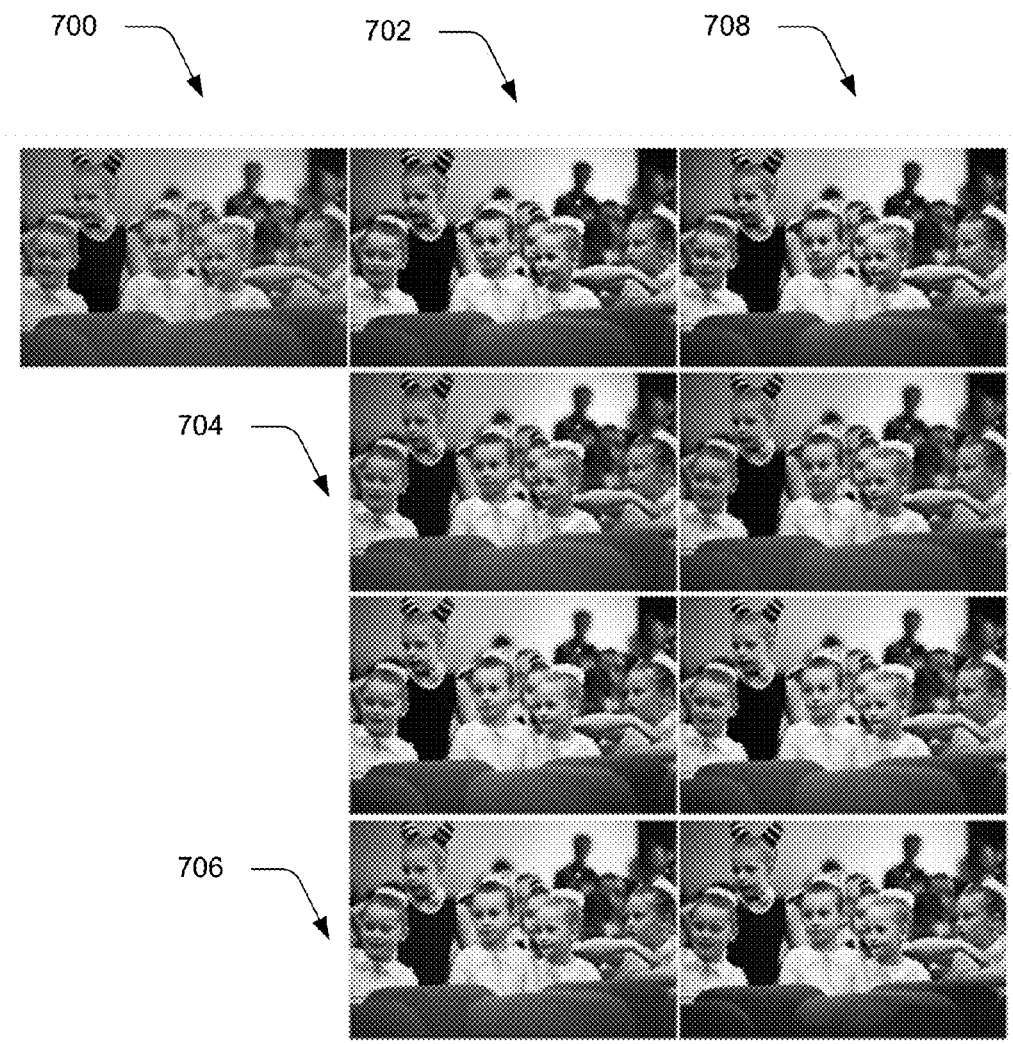
FIG. 7 is an illustration of an input image that has been processed using face color correction in accordance with one or more implementations.

FIGS. 6 and 7 show the results of using this technique to correct the color tones of a stylization technique applied to two different images.

Starting first with FIG. 6, an input image is shown at 600. Column 602 shows four images that have been created by applying a set of four different color and tone transformations, i.e., four different stylizations. Some of the stylizations appear to be good or acceptable. The stylization for image 604, however, is undesirable because the skin tones have taken on undesirable colors. For example, in the color version of this image, there is a strong pink effect which dominates the subjects' clothes and the path along which they are walking. Column 606 shows the corresponding four images for image 600, after the image has been color corrected taking into account any undesirable skin tone shift as exemplified in column 602. The face color correction technique is able to detect these cases automatically and weaken the stylization to produce the results that appear in column 606. None of the images that appear in column 606 have undesirable color shifts. Notice that this correction is stronger for undesirable shifts but retains the original stylization for the other examples where the results were reasonable.

Consider now FIG. 7 which shows an input image at 700. Column 702 shows four images that have been created by applying a set of four different color and tone transformations, i.e., four different stylizations. Some of the stylizations appear to be good or acceptable. The stylization for image 704, however, is undesirable because the skin tones have taken on undesirable colors. For example, in the color version of this image, there is a strong green tone which dominates the subjects' faces and, for image 706, a strong blue tint. Column 708 shows the corresponding four images for image 700, after the image has been color corrected taking into account any undesirable skin tone shift as exemplified in column 702. The face color correction technique is able to detect these cases automatically and weaken the stylization to produce the results that appear in column 708. None of the images that appear in column 708 have undesirable color shifts. Notice that this correction is stronger for undesirable shifts but retains the original stylization for the other examples where the results were reasonable.

As can be seen from these results, when the stylization is reasonably good, this technique retains the result. However, when the stylization is very strong and introduces undesirable skin tones, the technique automatically detects and corrects these cases.

Figure 8:
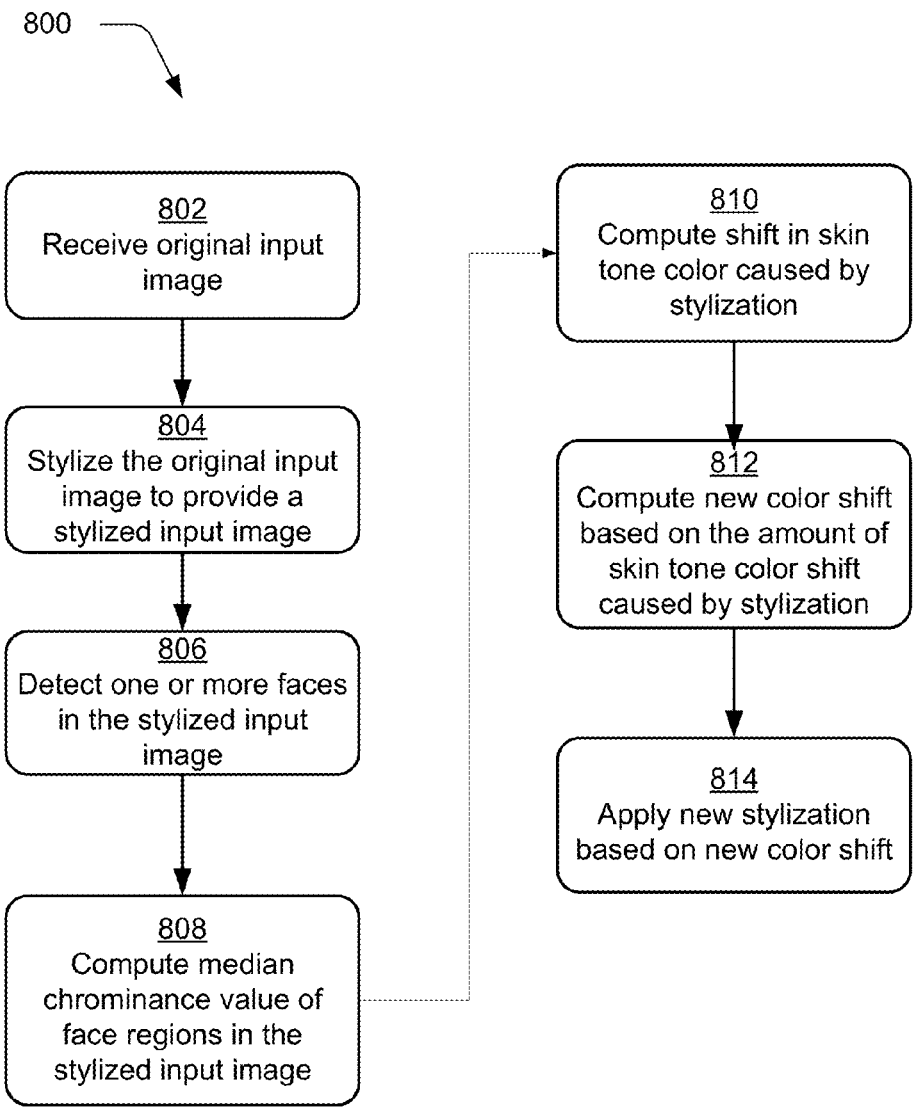
FIG. 8 is a flow diagram depicting an example procedure in accordance with one or more implementations.

FIG. 8 describes an example face color correction procedure 800 for correcting undesirable color shifts that can appear in images in accordance with various implementations. Aspects of the procedures may be implemented in hardware, firmware, or software, or a combination thereof. The procedures are shown as a set of blocks that specify operations performed by one or more devices and are not necessarily limited to the orders shown for performing the operations by the respective blocks. In at least some embodiments the procedures may be performed in a digital medium environment by a suitably configured device, such as the example computing device 202 of FIG. 2 that makes use of an image processing application 209, such as that described above.

An original input image is received (block 802) and stylized to produce a stylized input image (block 804). Stylization of the original input image can result in shifts in the input colors and, in particular, shifts in skin tone color. Examples of how this can be done are provided above. One or more faces are detected in the stylized input image (block 806). A median chrominance value is computed for face regions appearing in the stylized input image (block 808). The shift in skin tone color caused by stylization is then computed using the median chrominance value (block 810). One example of how this can be done is provided above. Recall that large shifts in skin tone typically lead to poor results. A new stylization is generated by computing new color shifts, based on an amount of skin tone color shift caused when the original input image was stylized (block 812). New stylization is applied to the original input image based on the new color shifts computed in block 812 (block 814).

Having considered an example procedure in accordance with one or more implementations, consider now an example system and device that can be utilized to practice the inventive principles described herein.

Example System and Device

Figure 9:
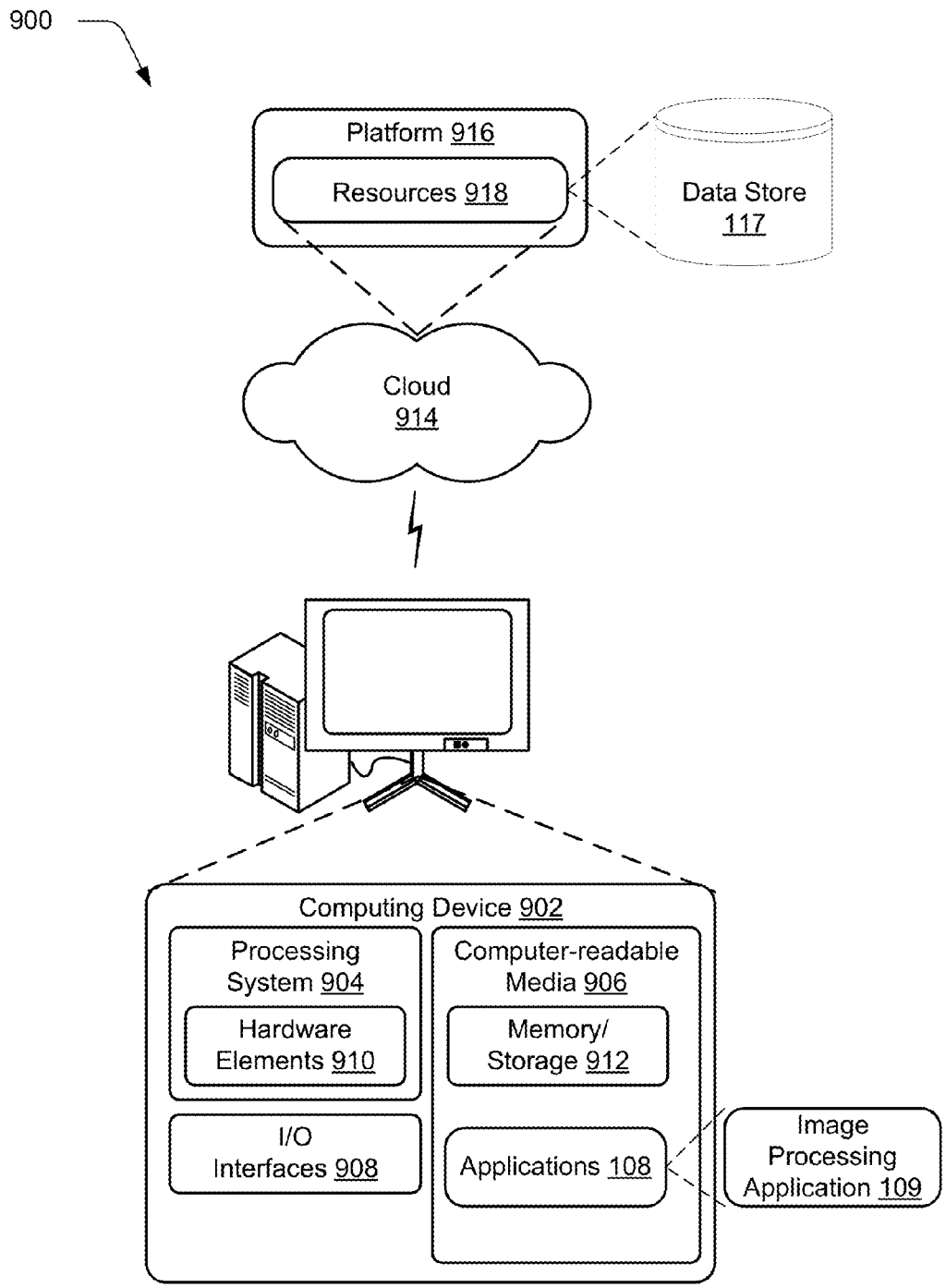
FIG. 9 illustrates an example system including various components of an example device that can be employed for one or more search implementations described herein.

FIG. 9 illustrates an example system generally at 900 that includes an example computing device 902 that is representative of one or more computing systems and/or devices that may implement the various techniques described herein. This is illustrated through inclusion of the applications 108 and, in particular, image processing application 109, which operates as described above. The computing device 902 may be, for example, a server of a service provider, a device associated with a client (e.g., a client device), an on-chip system, and/or any other suitable computing device or computing system.

The example computing device 902 is illustrated includes a processing system 904, one or more computer-readable media 906, and one or more I/O interface 908 that are communicatively coupled, one to another. Although not shown, the computing device 902 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 904 is representative of functionality to perform one or more operations using hardware. Accordingly, the processing system 904 is illustrated as including hardware elements 910 that may be configured as processors, functional blocks, and so forth. This may include implementation in hardware as an application specific integrated circuit or other logic device formed using one or more semiconductors. The hardware elements 910 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 906 is illustrated as including memory/storage 912. The memory/storage 912 represents memory/storage capacity associated with one or more computer-readable media. The memory/storage component 912 may include volatile media (such as random access memory (RAM)) and/or nonvolatile media (such as read only memory (ROM), Flash memory, optical disks, magnetic disks, and so forth). The memory/storage component 912 may include fixed media (e.g., RAM, ROM, a fixed hard drive, and so on) as well as removable media (e.g., Flash memory, a removable hard drive, an optical disc, and so forth). The computer-readable media 906 may be configured in a variety of other ways as further described below.

Input/output interface(s) 908 are representative of functionality to allow a user to enter commands and information to computing device 902, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 902 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 802. By way of example, and not limitation, computer-readable media may include "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media does not include signals per se or signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 802, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 910 and computer-readable media 906 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 910. The computing device 902 may be configured to implement particular instructions and/or functions corresponding to the software and/or hardware modules. Accordingly, implementation of a module that is executable by the computing device 902 as software may be achieved at least partially in hardware, e.g., through use of computer-readable storage media and/or hardware elements 910 of the processing system 904. The instructions and/or functions may be executable/operable by one or more articles of manufacture (for example, one or more computing devices 902 and/or processing systems 904) to implement techniques, modules, and examples described herein.

The techniques described herein may be supported by various configurations of the computing device 902 and are not limited to the specific examples of the techniques described herein. This functionality may also be implemented all or in part through use of a distributed system, such as over a "cloud" 914 via a platform 916 as described below.

The cloud 914 includes and/or is representative of a platform 916 for resources 918. The platform 916 abstracts underlying functionality of hardware (e.g., servers) and software resources of the cloud 914. The resources 918 may include applications and/or data that can be utilized while computer processing is executed on servers that are remote from the computing device 902. Resources 918 can also include services provided over the Internet and/or through a subscriber network, such as a cellular or Wi-Fi network.

The platform 916 may abstract resources and functions to connect the computing device 902 with other computing devices. The platform 916 may also serve to abstract scaling of resources to provide a corresponding level of scale to encountered demand for the resources 918 that are implemented via the platform 916. Accordingly, in an interconnected device embodiment, implementation of functionality described herein may be distributed throughout the system 900. For example, the functionality may be implemented in part on the computing device 902 as well as via the platform 916 that abstracts the functionality of the cloud 914.

CONCLUSION

In one or more implementations, a digital medium environment includes a computing device having an image processing application that performs face exposure correction on an input image. The image processing application receives an input image having a face and ascertains a median luminance associated with a face region corresponding to the face. Luminance refers to the intensity or brightness in an image. The image processing application determines whether the median luminance is less than a threshold luminance. If the median luminance is less than the threshold luminance, the image processing application computes weights based on a spatial distance parameter and a similarity parameter associated with the median chrominance of the face region. The spatial distance parameter takes into account how far a particular pixel is from the center of a detected face. The similarity parameter takes into account how close a particular pixel's color is to the median chrominance of the face region. The image processing application then computes a corrected luminance using the weights and applies the corrected luminance to the input image.

In one or more other implementations, a digital medium environment is described in which a computing device can use an image processing application to perform improved face color correction. The image processing application receives a stylized input image corresponding to an input image and computes a median chrominance value for a face region corresponding to a face detected in the stylized input image. The image processing application then uses the median chrominance value to compute a shift in skin tone color caused by stylizing the input image. Based on the amount of skin tone color shift caused by stylization, the image processing application computes new color shifts to provide a new stylization which the image processing application then applies to the input image that was originally stylized to provide the stylized input image.

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment including an image processing application that performs face exposure correction on an input image, an improved face exposure correction method implemented by the image processing application, the method comprising:
    receiving an input image including a depiction of a face;
    ascertaining a median luminance associated with a face region corresponding to the depiction of the face;
    determining whether the median luminance is less than a threshold luminance;
    responsive to the median luminance being less than the threshold luminance, computing weights based on a spatial distance parameter and a similarity parameter associated with a median chrominance of the face region;
    computing a corrected luminance using the weights; and
    applying the corrected luminance to the input image;
    wherein the method is performed by a computing device executing the image processing application.

2. A method as described in claim 1, wherein the spatial distance parameter corresponds to how close a particular pixel in the input image is to a center of the depiction of the face.

3. A method as described in claim 1, wherein the similarity parameter corresponds to how similar a particular pixel's color in the input image is to the median skin color in the face region.

4. A method as described in claim 1, wherein said computing weights, said computing the corrected luminance, and said applying the corrected luminance are performed on a pixel-by-pixel basis on pixels of the input image.

5. A method as described in claim 1 further comprising detecting the depiction of the face using a coarse box that contains pixels that are not associated with the face region.

6. A method as described in claim 1, wherein the input image includes multiple depictions of faces and performing said ascertaining, said determining, said computing weights, said computing the corrected luminance, and said applying are performed relative to the multiple depictions of the faces.

7. A method as described in claim 1, wherein the input image includes depictions of multiple faces and further comprising for depictions of the multiple faces that appear close together in the input image that cause individual pixels to appear in a region of overlap such that the individual pixels are luminance-corrected twice, maintaining a map of pixels in the region of overlap that have been luminance-corrected, and selecting a brighter correction of the luminance corrections for the individual pixels.

8. In a digital medium environment in which a computing device can use an image processing application to perform face color correction, one or more computer-readable storage media comprising instructions that are stored thereon that, responsive to execution by the computing device, perform improved face color correction operations comprising:
receiving a stylized input image corresponding to an original input image;
computing a median chrominance value for a face region corresponding to a face detected in the stylized input image;
using the median chrominance value to compute a shift in skin tone color caused when the original input image was stylized;
generating a new stylization by computing new color shifts, based on an amount of skin tone color shift caused when the original input image was stylized; and
applying the new stylization to the original input image that was stylized to provide the stylized input image.

9. The one or more computer-readable storage media as described in claim 8 further comprising prior to receiving the stylized input image, stylizing the original input image to provide the stylized input image.

10. The one or more computer-readable storage media as described in claim 9, wherein said stylizing comprises using an affine transformation to transform color values of the original input image.

11. The one or more computer-readable storage media as described in claim 9, wherein stylizing the original input image comprises stylizing the original input image as follows:

$$s(x)=M(c(x)-t_1)+t_2,$$

Where c(x) represents a chrominance c of the original input image, at pixel x,
Where s(x) represents stylized chrominance, s, at the pixel x,
M represents an affine function used to stylize the original input image,
$t_1$ represents chrominance mean of the original input image and $t_2$ represents the chrominance mean of a style example image which is used to manipulate color distribution in the original input image.

12. The one or more computer-readable storage media as described in claim 11, wherein using the median chrominance value to compute a shift in skin tone color caused by stylizing the original input image comprises computing the shift in skin tone color as follows:

$$d=\|\bar{c}-M(\bar{c}-t_1)-t_2\|^2,$$

Where $\bar{c}$ is the median chrominance value in the face region.

13. The one or more computer-readable storage media as described in claim 12, wherein generating a new stylization by computing new color shifts is performed as follows:

$$\beta = \begin{cases} 1, & \text{if } d < d_{th} \\ \exp(-(d-d_{th})^2/\alpha_d), & \text{otherwise} \end{cases}$$

$$t'_2 = t_1 + (\beta + d_{off})/(1 + d_{off}) * (t_2 - t_1)$$

Where $t_2'$ represents the new color shift;
$d_{th}$ and $\alpha_d$ define what is considered as a large color shift; and
$d_{off}$ controls the minimum scaling of the color shift allowed.

14. The one or more computer-readable storage media as described in claim 8, wherein the original input image was stylized using an affine transformation.

15. The one or more computer-readable storage media as described in claim 8, wherein the original input image was stylized as follows:

$$s(x)=M(c(x)-t_1)+t_2,$$

Where c(x) represents a chrominance c of the original input image, at pixel x,
Where s(x) represents stylized chrominance, s, at the pixel x,
M represents an affine function used to stylize the original input image,
$t_1$ represents the chrominance mean of the original input image and $t_2$ represents the chrominance mean of a style example image which is used to manipulate color distribution in the original input image.

16. The one or more computer-readable storage media as described in claim 15, wherein using the median chrominance value to compute a shift in skin tone color caused by stylizing the original input image comprises computing the shift in skin tone color as follows:

$$d=\|\bar{c}-M(\bar{c}-t_1)-t_2\|^2$$

Where $\bar{c}$ is the median chrominance value in the face region.

17. The one or more computer-readable storage media as described in claim 16, wherein generating a new stylization by computing new color shifts is performed as follows:

$$\beta = \begin{cases} 1, & \text{if } d < d_{th} \\ \exp(-(d-d_{th})^2/\alpha_d), & \text{otherwise} \end{cases}$$

$$t'_2 = t_1 + (\beta + d_{off})/(1 + d_{off}) * (t_2 - t_1)$$

Where $t_2'$ represents the new color shift;
$d_{th}$ and $\alpha_d$ define what is considered as a large color shift; and
$d_{off}$ controls the minimum scaling of the color shift allowed.

18. The one or more computer-readable storage media as described in claim 9, wherein applying the new stylization comprises applying the new stylization globally to the original input image.

19. A system implemented in a digital medium environment including a computing device having an image processing application to enable improved face exposure correction and improved face color correction, the system comprising:
a processing system;
one or more computer readable media storing instructions executable via the processing system to implement an image processing application comprising:

a face exposure correction component configured to perform operations comprising:
    ascertaining a median luminance associated with a face region corresponding to a depiction of a face in an input image;
    determining whether the median luminance is less than a threshold luminance;
    responsive to the median luminance being less than the threshold, computing weights based on a spatial distance parameter and a similarity parameter associated with a median chrominance of the face region;
    computing a corrected luminance using the weights; and
    applying the corrected luminance to the input image; and
a face color correction component configured to perform operations comprising:
    receiving a stylized input image corresponding to an original input image;
    computing a median chrominance value for a face region corresponding to a face detected in the stylized input image;
    using the median chrominance value to compute a shift in skin tone color caused when the original input image was stylized;
    generating a new stylization by computing new color shifts, based on an amount of skin tone color shift caused when the original input image was stylized; and
    applying the new stylization to the original input image that was stylized to provide the stylized input image.

20. The system as described in claim 19, wherein the computing device comprises a camera.

* * * * *